United States Patent
Hedgepeth

[15] 3,635,496
[45] Jan. 18, 1972

[54] SWAY CONTROL UNIT

[72] Inventor: Edward B. Hedgepeth, Salt Lake City, Utah

[73] Assignees: Clifton E. Hedgepeth; Royce Doyle Hedgepeth; Jetta V. Vincent, all of Salt Lake City, Utah, part interest to each

[22] Filed: Oct. 8, 1969

[21] Appl. No.: 864,604

[52] U.S. Cl. ................................................. 280/446 B
[51] Int. Cl. ..................................................... B60d 1/00
[58] Field of Search ........................ 280/446.3, 446, 446 B

[56] References Cited

UNITED STATES PATENTS

| | | | |
|---|---|---|---|
| 3,273,911 | 9/1966 | Waldie | 280/446 B |
| 3,294,421 | 12/1966 | Mathisen | 280/446 B |
| 3,442,534 | 5/1969 | McCorkle | 280/511 |

FOREIGN PATENTS OR APPLICATIONS

| | | | |
|---|---|---|---|
| 517,003 | 2/1953 | Belgium | 280/446 B |
| 840,845 | 7/1960 | Great Britain | 280/446 B |
| 695,898 | 9/1940 | Germany | 280/446 B |

Primary Examiner—Leo Friaglia
Attorney—B. Deon Criddle

[57] ABSTRACT

A sway control unit to be linked between a towing vehicle and a towed vehicle and providing a rotary frictional resistance to lateral weaving or swaying of the towed vehicle with respect to the towing vehicle, without adversely affecting free vertical or necessary horizontal angular displacement of the vehicles relative to one another.

8 Claims, 5 Drawing Figures

PATENTED JAN 18 1972 3,635,496
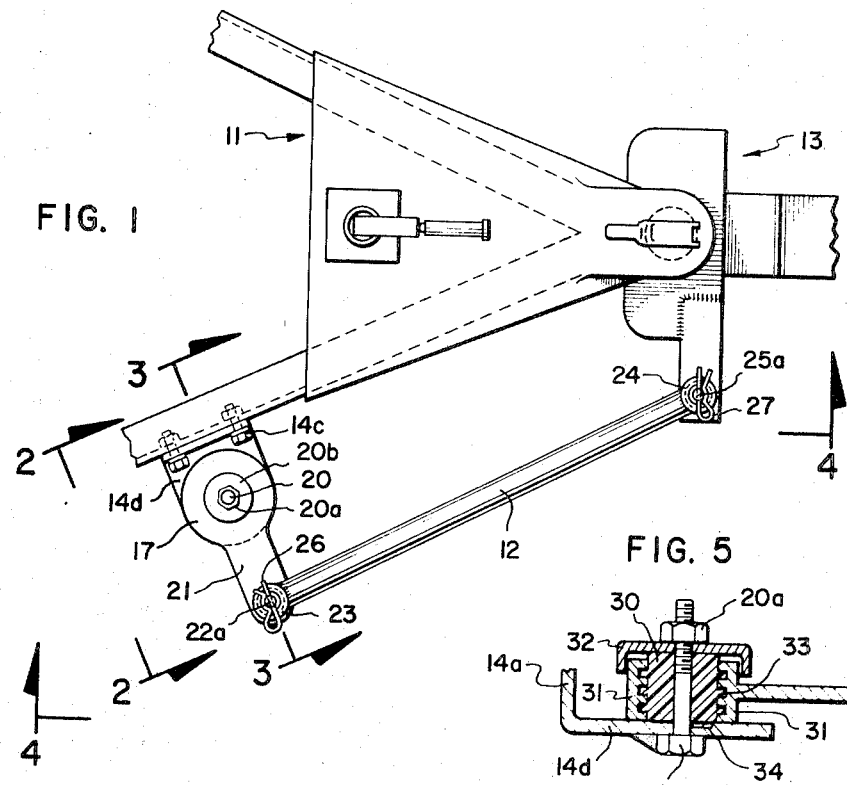
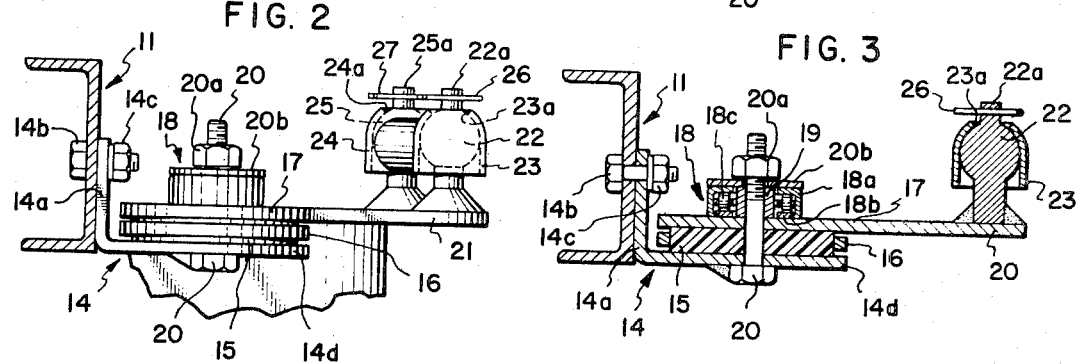
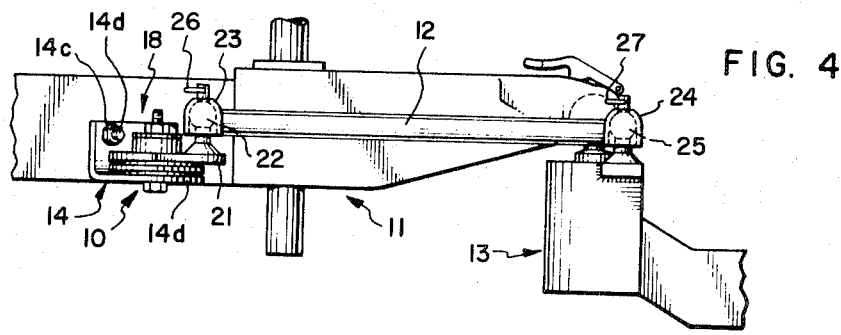
INVENTOR:
EDWARD B. HEDGEPETH
BY:
B. Dean Criddle
ATTORNEY

SWAY CONTROL UNIT

BRIEF DESCRIPTION OF THE INVENTION

It has long been recognized that there is a need for means to retard or prevent the lateral swaying of a towed vehicle, such as a trailer, with respect to a towed vehicle. In the absence of such means rough terrain, winding roads, crosswinds, or emergency stops, for example, can all cause the towed vehicle to swing from side to side behind the towing vehicle. This may present a hazard to oncoming traffic and is particularly dangerous to the driver and occupants of the towing vehicle since it may cause the driver to lose control.

There have been a number of devices proposed in the past to provide sway control. These have included hydraulic retarders, and mechanical controls providing a reciprocating frictional resistance such as is disclosed in U.S. Pat. No. 3,294,421 and in my copending application for U.S. Pat. Ser. No. 803,618, filed Mar. 3, 1969, now U.S. Pat. No. 3,531,139 and entitled "Improved Sway Control for Trailers." Many of these previously known devices are satisfactory if properly used, but others are too costly or difficult to properly adjust to be widely accepted.

Objects of the present invention are to provide a reliable and low-cost sway control unit that can be easily linked between a towing vehicle and a towed vehicle, regardless of the type hitch used to couple the two vehicles, and that will provide a positive push-or-pull force transmission through a retarder brake to prevent lateral free swaying of a towed vehicle with respect to a towing vehicle.

Other objects are to provide such a sway control unit wherein the retarder brake can be readily adjusted to preset the frictional restraint to sway of the towed vehicle and one that will not be adversely affected by ice, snow, rain or other weather conditions.

Still further objects are to provide a sway control unit with a retarder brake that depends on a rotating friction force rather than a reciprocating action and to greatly reduce the possibility of foreign matter adversely affecting the frictional retardation of the unit.

Principal features of the unit include a rotational retarder brake unit wherein an adjustably compressed brake pad member and a cooperating brake plate member are placed in surface-to-surface engagement to frictionally resist turning of a connected arm when the relative lateral positions of a towed vehicle and a towing vehicle are changed. A rigid connecting link is universally coupled between one of the vehicles and the connected arm and the brake unit is fixed to the other vehicle. The brake pad is preferably made of a suitable elastomeric material having a limited degree of lubricity that will deform when compressed, and surrounding members that prevent undesired expansion of the pad, provide a protective cover for the pad and prevent inadvertant tightening of the frictional resistance to the point where the towed vehicle will not properly trail. A thrust bearing may be used to insure smooth rotation of the brake pad or plate, within the frictional resistance set on the unit, to prevent loosening of the adjustment means and to facilitate setting of the adjustment means.

Other objects and features of the invention will become apparent from the following description and drawings.

THE DRAWINGS

FIG. 1 is a top plan view of one preferred embodiment of the sway control unit of the invention, with the tongue of a towed vehicle and the towing support of a towing vehicle shown fragmentarily;

FIG. 2, a vertical view taken on the line 2—2 of FIG. 1;

FIG. 3, is a vertical sectional view taken on the line 3—3 of FIG. 1;

FIG. 4 a vertical view taken on the line 4—4 of FIG. 1; and

FIG. 5, a view like that of FIG. 3, but showing the invention with another form of retarder brake.

DETAILED DESCRIPTION

Referring now to the drawings:

In the illustrated preferred embodiment of FIGS. 1–4, the sway control unit of the invention includes generally a retarder brake unit 10, shown mounted on a bifurcated trailer tongue 11, and a rigid link 12 interconnecting the brake unit and a towing support 13 fixed to a towing vehicle, not shown. As will be apparent, while the brake unit is here shown securely mounted on the tongue of the trailer or towed vehicle it could as well be affixed on the towing vehicle and link 12 could then be used to interconnect the towed vehicle and the brake unit.

As shown, the brake unit 10 includes an L-shaped mounting bracket 14, one leg 14a of which is adapted to be mounted as by bolts 14b and nuts 14c or by welding, or the like, to the trailer tongue 11. The other leg 14d of bracket 14 then extends outwardly from the trailer tongue and the upper face thereof is formed as a support plate.

A pad 15 of suitable tough elastomeric material such as "Adaprene" manufactured by the Dupont Corporation is placed on the support plate and a ring 16 of metal or other sufficiently strong material is placed closely around the pad 15.

Ring 16 has a thickness somewhat less than that of the uncompressed pad 15 and the differential thickness will depend on the characteristics of the material from which pad 15 is made. In any event, when the pad is compressed tightly against plate 14d, as will be hereinafter more fully described, ring 16 serves as a stop to limit the deformation and hence increases the frictional engagement between the pad 15 and the plate 14d and a brake plate 17. By confining the material from which the pad is made so that it will not "flow" out from between the support plate 14d and a brake plate 17, a desired frictional relationship can be set.

The circular, flat compression and brake plate 17 fits on top of pad 15 and a thrust bearing assembly 18 is positioning on top of compression and brake plate 17 and around a bushing 19 that surrounds a bolt 20.

Bolt 20 extends through the entire assembly and a nut 20a thereon secures the assembly together and provides a means whereby the frictional resistance developed between pad 15 and compression and brake plate 17 can be preset as desired.

An arm 21, fixed to and extending outwardly from plate 17 has an upstanding ball 22 fixed thereto to receive socket 23 at one end of the link 12, the other end of which has a socket 24 thereon adapted to fit on a ball 25 fixed to the towing support 13. The sockets 23 and 24 preferably have openings 23a and 24a in the top thereof, through which projections 22a and 25a of the balls 22 and 25 respectively extend. The projections 22a and 25a have holes therethrough and spring safety clips 26 and 27 are respectively inserted through the holes to hold the sockets on the balls. The ball-and-socket couplings provide universal connections between the link and the towing vehicle and the link and the brake unit so that the sway control unit does not in any way adversely affect vertical angular displacement of the vehicles relative to one another. At the same time the connections allow for complete horizontal turning of the vehicles relative to one another, subject to the restraint imposed by the braking unit.

In operation, turning of either vehicle with respect to the other will cause rigid link 12 to either push-or-pull arm 19 and thereby rotate plate 17 with respect to the brake pad. The frictional engagement between the brake pad and plate 17 thus serves to resist free swinging or swaying movement of the towed vehicle with respect to the towing vehicle and forces the towed vehicle to stay more nearly behind the towing vehicle except when a positive pushing or pulling force is applied that is strong enough to overcome the frictional resistance. Alternatively, although not shown in the drawings, arm 21 could alternatively be connected to ring 16, which in turn could be fixed to the pad 15 to give the same frictional restraint.

Conventional thrust bearing assembly 18 includes an upper raceway 18a, a lower raceway 18b and rollers 18c therebetween. Nut 20a acts on upper raceway 18a through a washer 20b and the lower raceway rests on and turns with brake plate 17. The bearing assembly insures that plate 17 will not be clamped so tightly by bolts 20 and nut 20a that it cannot be turned. At the same time, the bearing assembly allows movement of the brake plate without moving nut 20a and makes it easier to adjust the frictional restraint since the nut can be more easily turned with the upper raceway 18a.

While coupling ball 22 is shown mounted on an arm 21 that extends out from plate 17 it should be apparent that the arm can be omitted and the ball 22 can be fixed directly to plate 17. It is only necessary that the ball 20 be eccentrically mounted with respect to the opening of plate 17 through which bolt 20 is inserted so that when a sufficiently large moment force is created through relative turning of the vehicles the plate 17 is positively turned to the extent necessary for proper trailing of the towed vehicle.

As is shown in FIG. 5, the retarder brake unit can also utilize a relative rotational braking force between an upstanding cylindrical brake pad 30 of suitable elastomeric material, such as "Adaprene" and a surrounding brake sleeve 31 to which the arm 21 is secured.

Bolt 20 extends up through leg 14d of support plate 14 as previously described and pad 30 surrounds the bolt. Nut 20a is then threaded onto the bolt to force a compression plate 32 against the pad 30, which extends upwardly above sleeve 31. This expands the elastomeric pad against the inner wall of sleeve 31, thereby increasing the frictional resistance between them. If desired, a thrust bearing like that shown in FIGS. 1–4 can be used beneath the nut 20a and the compression plate 31 to facilitate frictional adjustment, as previously described.

If the inner wall of sleeve 31 is notched or grooved, as shown at 33, the pad 30 will be deformed into the notches or grooves to provide an even greater resistance to relative movement between the sleeve and the pad when nut 20a is tightened on bolt 20. In either embodiment of the invention, the retarder brake pad can be allowed to slide freely with respect to the support plate 14d or the plate 14d can have grooves or notches therein as shown at 34 in FIG. 5, or be otherwise provided with irregularities into which the pad will deform when it is compressed. The resistance to turning of the pad with respect to the support plate can thus be greatly increased. While not shown in the embodiment of FIGS. 1–4, it should be apparent that similar notches, grooves or irregularities can be provided in the surface of brake plate 17 in engagement with the brake pad. Whether or not such structure is used will be dependent on such factors as the resistance to turning that is desired and the nature of the materials that are used.

Materials other than "Adaprene" can be used as the brake pad, but because of its durability, resistance to weathering, and limited lubricity, even under compression, this has been found to be an ideally suitable material.

Other changes and modifications, within the scope of the following claims, will be obvious to those skilled in the art.

We claim:

1. A sway control unit for connection between a towed vehicle and a towing vehicle comprising
a retarder brake unit adapted to be fixed to one of said vehicles and including a brake pad member, a brake plate member, a support plate beneath the brake pad arranged such that the brake plate member is positioned above the pad and adjustable means for clamping said bearing assembly, brake plate member, brake pad member and support plate together, whereby a desired frictional engagement can be provided between the brake pad and the brake plate during rotation of one of them with respect to the other about a common central axis;
a thrust bearing between said clamping means and said brake plate;
a rigid link;
means for universally coupling one end of said link to the other vehicle; and
means for universally coupling the other end of said link to one of said members at a point spaced from the said central axis.

2. A sway control unit for connection between a towed vehicle and a towing vehicle comprising
a retarder brake unit adapted to be fixed to one of said vehicles and including a brake pad member, a brake plate member, a support plate having an irregular pad-engaging surface beneath the brake pad arranged such that the brake plate member is positioned above the pad and adjustable means for clamping said bearing assembly, brake plate member, brake pad member and support plate together, whereby the pad is deformed into the irregularities of the pad-engaging surface and a desired frictional engagement can be provided between the brake pad and the brake plate during rotation of one of them with respect to the other about a common central axis;
a rigid link;
means for universally coupling one end of said link to the other vehicle; and
means for universally coupling the other end of said link to one of said members at a point spaced from the said central axis.

3. A sway control unit for connection between a towed vehicle and a towing vehicle comprising
a retarder brake unit adapted to be fixed to one of said vehicles and including a brake pad member, a support plate, a cylindrical brake plate member extending around the pad, above the support plate, with the pad extending above the brake plate, a compression plate on the pad above the brake plate, and adjustable means for clamping the pad between the support plate and the compression plate, whereby the pad may be expanded into preset frictional engagement with the brake plate and whereby one of said members is rotatable with respect to the other about a common axis;
a rigid link;
means for universally coupling one end of said link to the other vehicle; and
means for universally coupling the other end of said link to one of said members at a point spaced from the said common axis.

4. A sway control unit as in claim 3, wherein the inner surface of the brake plate is irregular and the brake pad is deformable into the irregularities thereof.

5. A sway control unit as in claim 3, wherein the pad-engaging surface of the support plate is irregular and the pad is deformable into the irregularities thereof.

6. A sway control unit for connection between a towed vehicle and a towing vehicle comprising
a retarder brake unit adapted to be fixed to one of said vehicles and including a brake pad member having a pad-engaging surface formed irregular, whereby the pad is deformable into the irregularities thereof, and a brake plate member and means for clamping said brake pad member and brake plate member together in a surface-to-surface relationship whereby one of them is rotatable with respect to the other about a common central axis;
a rigid link;
means for universally coupling one end of said link to the other vehicle; and
means for universally coupling the other end of said link to one of said members at a point spaced from the said central axis.

7. A sway control unit for connection between a towed vehicle and a towing vehicle comprising
a retarder brake unit adapted to be fixed to one of said vehicles and including a brake pad member and a brake plate member and means for clamping said brake pad member and brake plate member together in a surface-to-surface relationship whereby one of them is rotatable with respect to the other about a common central axis;

a rigid link; and means for universally coupling the rigid link comprising a socket at each end of the link having a hole centrally through the top thereof, a ball fixed to each vehicle and having a projection thereon adapted to extend through a hole in the socket when the ball is in the socket, said projections each having holes therethrough, and spring clips adapted to be inserted through the holes in the projections and to be held therein, whereby the sockets cannot be removed from the balls until the spring clips have been removed from the holes through the projections.

8. A sway control unit for connection between a towed vehicle and a towing vehicle comprising a retarder brake unit adapted to be fixed to one of said vehicles and including a brake pad member and a brake plate member and means for clamping said brake pad member and brake plate member together in a surface-to-surface relationship whereby one of them is rotatable with respect to the other about a common central axis;

a thrust bearing between said clamping means and said brake plate;

a rigid link;

means for universally coupling one end of said link to the other vehicle; and means for universally coupling the other end of said link to one of said members at a point spaced from the said central axis.

* * * * *